L. O'BRIEN.
VEHICLE SIGNAL.
APPLICATION FILED DEC. 22, 1910.

1,140,898.

Patented May 25, 1915.

Witnesses  Inventor

UNITED STATES PATENT OFFICE.

LEO O'BRIEN, OF MONTCLAIR, NEW JERSEY.

VEHICLE-SIGNAL.

1,140,393.  Specification of Letters Patent.  Patented May 25, 1915.

Application filed December 22, 1910. Serial No. 598,723.

*To all whom it may concern:*

Be it known that I, LEO O'BRIEN, a citizen of the United States, residing at Montclair, in the county of Essex and State of New Jersey, have invented certain new and useful Improvements in Vehicle-Signals, of which the following is a specification, reference being had therein to the accompanying drawing.

This invention relates to a signal for vehicles of various kinds, especially automobiles and other similar fast-driven cars, the object being to provide the combination of a danger signal with the ordinary tail lamp, so that the signal may be readily seen, used and operated for the purpose of promoting safety in the running of the machine.

The invention consists essentially in means for enabling the cautionary signal to be operated at a proper point on an automobile or other fast moving vehicle, the execution of the signal being made from a point convenient to the driver's seat through suitable electrical connections actuated by one of the foot levers on the front; and the invention also comprises certain details and peculiarities in the construction and combination substantially as will be hereinafter described and then more particularly pointed out in the claims.

Figure 1:
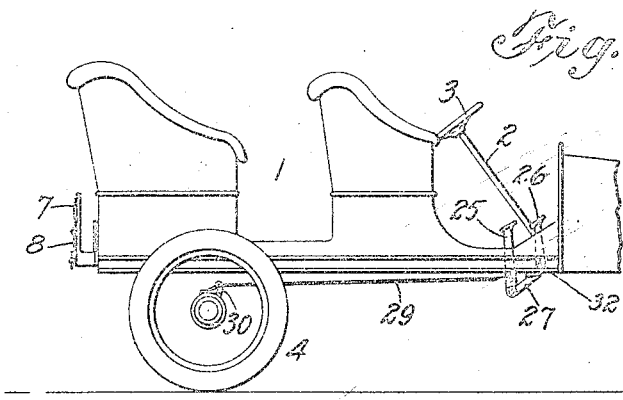
Figures 2, 3:
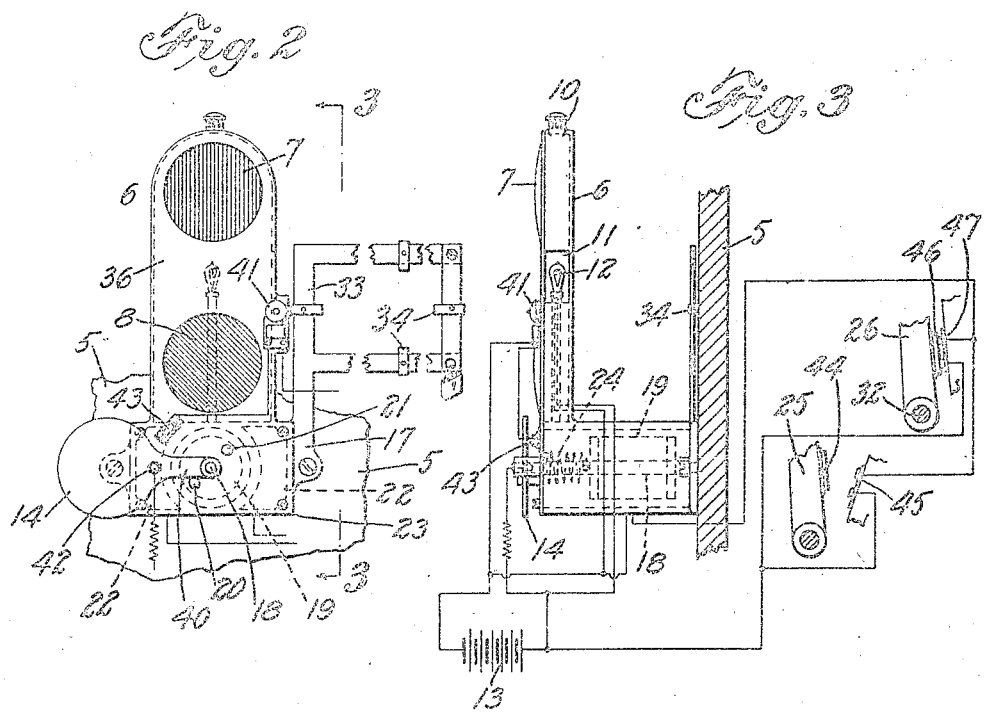

In the accompanying drawings illustrating my invention, Figure 1 is a partial side elevation of an automobile provided with my improved signaling device. Fig. 2 is an enlarged rear elevation of my improved signal and the appurtenant parts. Fig. 3 is a sectional side elevation of the same and indicates the electrical connections.

Similar characters of reference designate corresponding parts throughout the different parts of the drawing.

In my copending application for Letters Patent for improvements in vehicle signals, filed November 29, 1910, Serial No. 594,679, I have represented a signal similar in some respects to that disclosed in the present application but operated through mechanical devices, whereas in the present example of the invention electrical means are availed of for the purpose of transmitting the necessary impulses from the driver's location to the rear of the vehicle, where the operative parts of the signal are located.

1 denotes an automobile or other vehicle on which it is desirable to use some sort of a notifying signal to advise other following vehicles or cars of its intended movements.

4 denotes one of the rear wheels of the car, which is equipped with a suitable brake device 30 which is operated by a brake rod 29 leading to a point near the front end of the car, which rod is pivotally connected to a foot lever 25 hung in a bracket 27. I mention this form of brake device simply as an example for the purpose of illustration. Another foot lever 26 is situated near the foot lever 25, which foot lever 26 is hung pivotally on the frame at 32 and employed for the purpose of shifting the clutch which throws the motor into or out of gear, and I shall describe certain electrical connections which may be operated at one time by the clutch lever 26, and other electrical connections which can be operated at another time by the foot lever 25.

On the rear board or flat surface 5 of the main frame of the automobile 1 I support the lamp casing 6, which consists of a box of suitable form and shape in which is the lamp 12. The lamp in this instance is an ordinary incandescent lamp, whose current is supplied from the battery, as 13. But this lamp is given simply by way of example, and I do not wish to be confined to its use. The casing 6 is, furthermore, provided with a ventilator 10 at the upper end thereof. The front 36 of the casing 6 is provided with two or more colored glass pieces to furnish the corresponding number of illuminated signals, as, for instance, the red signal 7 having the function of an ordinary tail lamp, and the green signal 8 situated a short distance below the red signal 7. These signals 7 and 8 are merely circular disks of glass which are illuminated by the lamp 12 behind them so that one will show red while the other shows green. The lamp casing 6 is supported in any desirable manner on the rear board or frame 5. One way in which this can be done is my employing a bracket 17 which has also a rectangular or other shaped frame part 33 provided with clips 34 adapted to receive and contain the numbers or figures constituting the license number of the car. On the side of the lamp casing 6 is an opening 11 covered by a piece of white transparent glass whereby a lateral window is furnished through which the light shines from the lamp casing 6 upon the numbers carried in the frame 33, so that at night the license numbers may be plainly and clearly in view.

14 designates a disk which is adapted to cover and uncover the lowermost signal 8 of my signal mechanism, which signal in the present instance is the green light, whereby at times the green light is exposed to view in conjunction with the red light, while at other times the green light is covered and shut off permitting only the red light to be visible. Thus the disk 14 has a movement up and down in a vertical plane. It has an arm 40 which is rigidly secured to a horizontal rotary shaft 18, which passes horizontally and centrally through the revolving core 19 of a revolving magnet, which is located below and behind the casing 6 and is supported in connection therewith upon the bracket 17 and the rear board 5. The disk 14 is limited in its movement in one direction or the other by means of fixed stops 20 and 21. These stops allow the arm 40 of the disk 14 to move through an arc of 90° but stop it when it reaches a vertical position where the disk 14 covers the green light 8, and also stop it when it reaches its opposite position of horizontality as is shown in Fig. 3. At each side of the revolving core 19 is a part of an electromagnet 22. The end of the electromagnet 22 and the core 19 nearest the disk 14 is covered by a plate 23 secured in position by screws, and this plate carries the fixed stops 20 and 21 besides furnishing a bearing for the end of the rotary shaft 18. On the shaft 18 is an encircling spring 24, one end of which is fixed to the rear side of the plate 23, as shown in Fig. 3, while the other end is fastened to the shaft 18. When the magnets 22 are energized the rotary core 19 will revolve carrying with it the shaft 18 and shifting the disk 14 from the position where it covers the signal 8 to the position in Fig. 2, where the signal 8 is uncovered, and such movement will wind up the spring 24 or place it under tension so that when the electric circuit is again broken the spring 24 will act to rotate the core 19 into the reverse position, where the disk 14 will again cover the signal 8 as before, it being understood that ordinarily the green signal is concealed and covered, but is exposed to view at the moment when it is desired to caution or notify vehicles coming behind.

It is desirable, when the disk uncovers the green light, to have an audible signal operate concurrently, and to this end I employ an electric bell 41 in a circuit which includes the battery 13 and also a contacting piece 42 projecting through the disk 14 and another contact 43 on the plate 23. During the time that the inner end of the contact 42 is riding upon the contact 43 during the downward movement of the disk 14 the electric circuit will be closed and the bell will be ringing. Thus an audible signal is given at the moment the disk 14 uncovers the green signal.

In the operation of my improved vehicle signal it will be noted that the driver, by pressing upon the foot lever 25, can apply the brake and, at the same time, he will bring the contact piece 44 on lever 25 into contact with the parts 45, and thus close the electric circuit whose wiring is shown in Figs. 2 and 3, and energize the rotary magnet whereby the tension of the spring 24 be overcome temporarily, and the disk 14 brought down into the position where its arm 40 will rest on stop 20. When the contact between the parts 44 and 45 is broken by the releasing of the brake lever, the spring 24 will return the disk 14 to its position over the green signal. Likewise, when the clutch lever 26 is actuated, it will be seen that the contact 46 on lever 26 will be brought into touch with the contact piece 47, and the electric circuit closed, which will result in energizing the rotary magnet in the manner I have just explained with reference to the other electric circuit.

Many changes may be made in the precise construction and combination of the various parts without departing from my invention, and I, therefore, reserve the liberty of making such changes as experience may suggest to be necessary or desirable.

Having thus described my invention, what I claim as new and desire to secure by Letters Patent, is:—

In a vehicle signal, the combination of a casing having signal lights located in the same vertical plane, a lamp in said casing, a disk moving up and down in a vertical plane which is parallel to the plane in which the signal lights are located, said disk having an arm, fixed stops for limiting the movement of said disk at one end or the other of an arc of 90 degrees, against which stops the arm strikes, one stop having the function of stopping it in a vertical position, and the other having the function of stopping it in a horizontal position, a horizontal shaft carrying said disk and rigidly secured to the arm thereof, a spring surrounding said shaft and tensioned to be normally held in such a manner that the disk will normally cover one of the lights, a magnet whose central revolving core carries said shaft, and an electric circuit including the magnet, together with means for closing and breaking the circuit at times, in order that the disk may be properly actuated.

In testimony whereof I affix my signature in presence of two witnesses.

LEO O'BRIEN.

Witnesses:
 JEANNETTE STORK,
 L. S. PERRINE.